July 1, 1941. H. A. ADAMS 2,247,541
CONSTRUCTOR'S LEVEL AND GAUGE
Filed Nov. 13, 1939
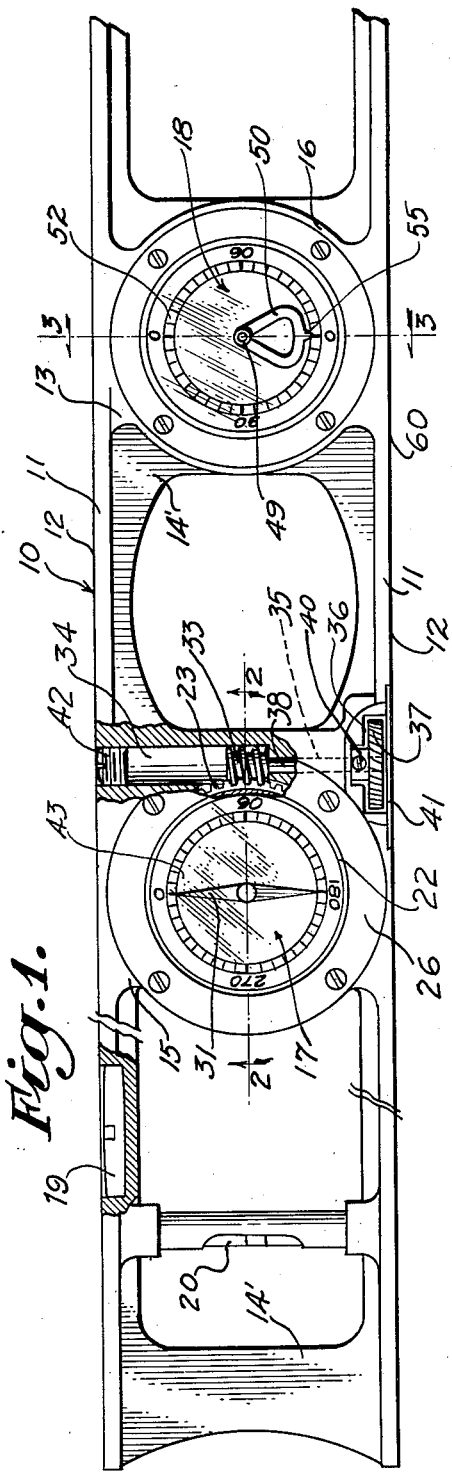
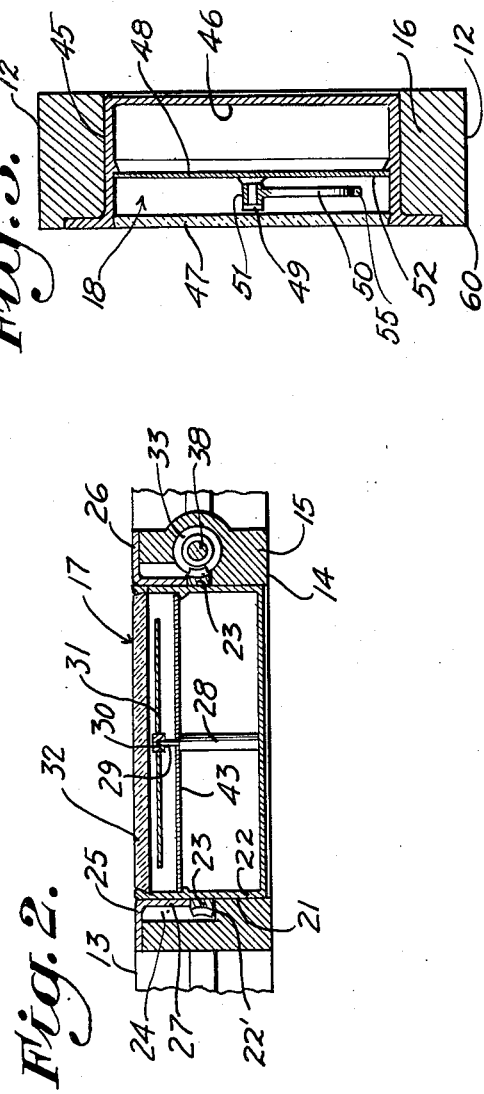
HAROLD A. ADAMS,
INVENTOR.
BY Jesse P. Whann
ATTORNEY.

Patented July 1, 1941

2,247,541

UNITED STATES PATENT OFFICE 2,247,541

CONSTRUCTOR'S LEVEL AND GAUGE

Harold A. Adams, Bakersfield, Calif., assignor of one-half to E. Roscoe Arnold, Bakersfield, Calif.

Application November 13, 1939, Serial No. 304,113

4 Claims. (Cl. 33—222)

My invention relates to a device having the general appearance of a carpenter's level and having incorporated therein, in addition to the ordinary bubble glass leveling means, simple means whereby vertical and horizontal angles may be established or checked.

It is an object of my present invention to provide a device of the general utility to constructors, builders, carpenters, etc., which device not only incorporates the ordinary leveling means employed in a carpenter's level, but also having means whereby the angular relation of members lying in a substantially horizontal plane may be determined or whereby a member may be located in a desired parallel or angular relation to another part or an established line, and whereby the slope or pitch of members may be determined or established and whereby azimuthal angles relative to magnetic north may be determined or laid out.

It is an object of the invention to provide an elongated frame or bar having parallel sides or edges, and having a compass mounted therein in such manner that ready reference to the compass may be had for determining or establishing horizontal angles. A feature of the invention is that this compass is provided with an adjustable dial provided with means whereby it may be rotated so as to quickly bring a desired point on the scale into a position to coincide with the compass needle, thereby facilitating the use of the device as will be hereinafter explained.

A further object of the invention is to provide in an article of the general utility set forth in the foregoing a simple means whereby vertical angles may be readily noted or established, whereby the slope or pitch of structural members or surfaces may be determined. A feature of the invention is that it incorporates in one tool or gauge means whereby a variety of results are accomplished, or measurements made as pointed out in this disclosure. It is an object of the invention to provide a constructor's level having a compass preferably mounted so as to lie below or at least flush with a surface of the body or frame of the device, and having a rotatable dial associated with a recessed manually engageable member by which the dial may be rotated.

A further object of the invention is to provide in a device of the character set forth in the preceding paragraph, a compass dial having an external worm gear which is engaged so as to rotate the dial by means of a worm screw chambered within the body of the device and having associated therewith a thumb knob disposed in such position that it will not interfere with the ordinary use of the device as a constructor's level, and in such position that it may be readily engaged and rotated while the device is lying flat, as on a surface, to accomplish rotation of the compass dial into a desired position relative to the compass needle.

A further object of the invention is to provide a pitch or level gauge comprising a weighted member swinging from a pivot so as to traverse a circular scale, whereby vertical angles relative to a horizontal plane may be measured or established.

Further objects and advantages of the invention will be brought out in the following part of the specification.

Referring to the drawing which is for illustrative purposes only:

Fig. 1 is a face view of a preferred form of my invention.

Fig. 2 is an enlarged fragmentary cross-section taken as indicated by the line 2—2 of Fig. 1.

Fig. 3 is an enlarged cross-section taken as indicated by the line 3—3 of Fig. 1.

The preferred form of the invention employs a bar or body 10 which may be readily cast from light weight metal such as Duralumin, this bar having a pair of parallel side walls 11, the outer faces 12 of which lie in parallel planes which are perpendicular to the parallel top and bottom faces 13 and 14 of the member. The side walls 11 are connected by webs 14', and between the side walls bodies 15 and 16 are formed to respectively support a horizontal angle indicator or compass 17 and a vertical angle indicator or gauge 18.

The member 10 carries a longitudinal bubble-type level gauge 19 and a transverse bubble-type level gauge 20 whereby the device may be used in the manner of an ordinary carpenter's level in the locating of structural members in horizontal and vertical planes.

As best shown in Fig. 2, the body 15 has a stepped bore 21 provided with an upwardly spaced shoulder 22' positioned between the upper and lower faces 13 and 14 of the bar 10. This stepped bore 21 receives a cylindrical case 22 which has a ring gear 23 mounted on the exterior thereof so as to rest in the upper part 24 of the bore 21 with the lower face of the ring gear 23 in engagement with the shoulder 22'. To hold the case 22 in the bore 21, and to permit the case to rotate on an axis parallel to the planes of the side faces 12, a bezel 25 is provided having a flange 26 recessed into the top of the body 15 and having a cylindrical wall 27 which extends down within the upper enlarged portion 24 of the bore 21, and engages the upper face of the ring gear 23. Within the case 22, a post 28 supports a pivot 29 on which a conical bearing 30 rests, this bearing 30 carrying a compass needle 31 magnetized so as to have north and south polarity. A glass 32 is secured in the upper part of the case 22 in such spaced relation to the bearing 30 that this bearing cannot be dislodged from the pivot 29. To cushion the movement of the compass needle, the case 22 may be substantially filled with a non-corrosive liquid.

A worm screw 33 is supported for engagement with the worm gear 23. A hole 34 having a diameter slightly larger than the screw 33 is drilled into the body 15 from one side face 12 of the bar 11, and a hole 35 of smaller diameter is extended from the bottom of the hole 34 to the opposite side face 12 to join a recess 36, as shown in Fig. 1, to receive a knob 37 having a diameter substantially equal to the thickness of the bar 10. The screw 33 is secured on one end of a shaft 38 and is passed into the position shown in the drawing through the opening 34, the shaft 38 extending through the opening 35 into the recess 36. The thumb knob 37 is then secured on the end of the shaft 38 which projects into the recess 36, as by means of a set screw 40, and a flush plate 41 is then secured across the face of the recess 36, and the mouth of the opening 34 is closed by means of a plug 42 to keep dirt from entering.

As shown in Fig. 1, the upper and lower extremities of the recess 36 are open to the top and bottom faces 13 and 14 of the bar 10 so that diametrally opposed portions of the periphery of the knob 37 are exposed for manual engagement, although no portion of the periphery of the knob 37 projects above the top face 13 or below the bottom face 14. A dial 43 is mounted in the case 22 under the needle 31, this dial being preferably graduated to divide the pole circle into 360 degree divisions. When the top and bottom faces 13 and 14 of the bar 10 lie in substantially horizontal planes, the needle 31 will be rotated by the earth's magnetic field so as to point to magnetic north. The dial 31 may be rotated so as to bring any desired graduation of the scale into a position to coincide with either end of the needle 31, by manual rotation of the knob 37 which will be imparted through the screw 33 to the worm gear 23, thereby rotating the case 22 and the dial 43 carried therein.

The body 16 of the bar 10 has an opening 45 which receives a cylindrical case 46 forming a part of the vertical angle or pitch gauge 18. This case 46 has a glass cover 47 and within the case 46 a wall 48 is supported in a position parallel to the planes of the top and bottom faces 13 and 14 of the bar 10. A stud 49 projects from the front face of the plate 48 on an axis which is perpendicular to the face of the plate 48, and on this stud 49 a weight 50 is hung by means of a sleeve bearing 51. In concentric relation to the stud 49, the front face of the plate 48 is inscribed with a dial 52 inscribed in degrees of quarter circles. This dial has two opposed zero points on a line perpendicular to the side faces 12 of the bar 10, and has diametrally opposed 90° indications disposed on a line parallel to the faces 12.

As shown in Fig. 1, when the bar 10 is placed on a level or horizontal surface, an indicating point 55 formed at the extremity of the weight member 50 will coincide with a zero point on the dial 52. Then, if one end of the bar 10 is raised so that the faces 12 thereof will extend at an angle to horizontal, the dial which is in fixed relation to the bar 10 will rotate relative to the weight which hangs vertically from the stud or pivot 49, and a different point in the scale 52 will be brought into coincidence with the indicating point 55 of the weight 50, this point on the scale indicating the angle of the faces 12 relative to a horizontal plane.

The general utility of the constructor's gauge will be perceived from the following. Numerous instances are found in general construction where it is desired to place a member in parallel or angled relation to another member. An instance of this may be the location of foundation forms. If one of these forms is to be placed parallel to an established line, for example a street curbing, the constructor's gauge is placed with one edge face 12 thereof against the upright face of the curb, with the faces 13 and 14 of the bar 10 in a substantially horizontal plane. The knob 37 may be then rotated so as to bring the zero point of the dial 43 into coincidence with one end of the compass needle 31. The bar 10 may be then moved over to the position in which the form is to be located and placed with one face 12 thereof against the side of the form and the form is then swung in a horizontal plane until the zero point of the dial 43 coincides with the point of the compass needle 31, at which time the form will then be parallel to the curb, for the reason that the side of the form will be then at the same angle to the magnetic meridian indicated by the compass needle 31 as the face of the curb. If another form is to run at right angles to the first form, the bar 10 is merely rotated until the 90° point on the dial 43 coincides with one end of the needle 31. A form member then placed against one of the side faces 12 of the bar 10 will rest at an angle of 90° to the previously placed form member. It will be understood that the device may be employed to determine angles of various size lying in substantially horizontal planes. The device may be readily employed to lay out boundary lines or the positions of corner posts for a structure, by merely resting the bar 10 with the bottom face 14 thereon on a horizontal surface whereupon the constructor may sight along a corner 60 as in the manner of sighting a transit, and this line of sight defined by the corner 60 may be swung through different angular positions as indicated by the compass needle 31 on the dial 43.

In many instances it is desirable to place wall members, such as ceilings or floors, in sloping position. The gauge 18 may be readily employed for this purpose. As an example, in the construction of mine bunkers the floor must have a pitch sufficient to produce a gravity flow of ore, and such pitch must be ordinarily at least 45° relative to horizontal. The bar 10 may be placed on the upper face of a floor joist, with the faces 13 and 14 thereof lying substantially in vertical plane and the pitch of the joist may be varied by respective raising and lowering of the ends thereof until the indicator 55 associated with the weight 50 indicates the required angle on the dial 52.

I claim as my invention:

1. In a combination constructor's gauge of the character described, the combination of: a bar element having top, bottom and side faces, there being a recess leading down into said bar element from the top face thereof and an opening leading in from one of said side faces thereof to meet a side portion of said recess; a compass element disposed in said recess so as to rotate on an axis perpendicular to said top face, said compass element having a peripheral worm gear, a dial in said casing and a compass needle pivotally mounted in said casing so as to traverse said dial; and a screw element in said opening to engage said worm gear, said screw element having a manually engageable portion placed so that at least a part thereof will be exposed for manual engagement whereby screw element may be rotated so as to turn said casing and said dial relative to said bar element.

2. In a combination constructor's gauge of the character described, the combination of: a bar element having top, bottom and side faces, there being a recess leading down into said bar element from the top face thereof and an opening leading in from one of said side faces thereof to meet a side portion of said recess, a portion of said opening being enlarged so as to be in open engagement with said top face of said bar element; a compass element disposed in said recess so as to rotate on an axis perpendicular to said top face, said compass element having a peripheral worm gear, a dial in said casing and a compass needle pivotally mounted in said casing so as to traverse said dial; and a screw element in said opening to engage said worm gear, said screw element having a manually engageable part in said enlarged portion of said opening with at least a portion thereof exposed for manual engagement whereby said screw element may be rotated so as to turn said casing and said dial relative to said bar element.

3. In a combination constructor's gauge of the character described, the combination of: a bar element having side edges and top and bottom faces, there being a recess leading into said bar element from the top face thereof and an opening leading in from the exterior thereof to meet said recess, a portion of said opening being open to one of said faces of said bar element; a compass needle disposed in said recess so as to rotate on an axis perpendicular to said top face; a dial rotatable on said axis; a rotatable member disposed in said enlarged portion of said opening; and operating means extending in said opening and having operative connection with said dial to rotate the same relative to said bar element, in response to actuation of said operating means.

4. In a constructor's gauge of the character described, the combination of: a bar element; a compass needle supported on said bar element; a dial showing divisions of a circle mounted so as to be traversed by said compass needle; and means disposed within the space defined by the external faces of said bar element, operative to rotate said dial relative to said bar element and around the pivot axis of said compass needle, whereby a selected division of the circle may be brought to coincide with said compass needle when said bar element is aligned with a member.

HAROLD A. ADAMS.